(12) United States Patent
Hillis et al.

(10) Patent No.: US 7,840,038 B2
(45) Date of Patent: *Nov. 23, 2010

(54) DEFECT CORRECTION BASED ON "VIRTUAL" LENSLETS

(75) Inventors: W. Daniel Hillis, Encino, CA (US); Nathan P. Myhrvold, Medina, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/636,418

(22) Filed: Dec. 8, 2006

(65) Prior Publication Data

US 2008/0137077 A1    Jun. 12, 2008

(51) Int. Cl.
*G06K 9/00*    (2006.01)

(52) U.S. Cl. ...................... 382/124; 351/246

(58) Field of Classification Search ................. 382/124
See application file for complete search history.

(56) References Cited

U.S. PATENT DOCUMENTS

| | | | |
|---|---|---|---|
| 5,717,453 A | 2/1998 | Wohlstadter | |
| 6,318,635 B1 | 11/2001 | Stoner | |
| 6,379,482 B1 | 4/2002 | Nakayasu et al. | |
| 6,810,151 B2 * | 10/2004 | Liu | 382/275 |
| 7,220,001 B2 * | 5/2007 | Hillis et al. | 351/246 |
| 7,440,637 B2 * | 10/2008 | Schechner et al. | 382/284 |
| 2003/0071969 A1 | 4/2003 | Levine et al. | |
| 2003/0098352 A1 | 5/2003 | Schnee et al. | |
| 2004/0056966 A1 * | 3/2004 | Schechner et al. | 348/229.1 |
| 2005/0185062 A1 * | 8/2005 | Hillis et al. | 348/218.1 |
| 2006/0033933 A1 | 2/2006 | Feierabend et al. | |
| 2008/0291322 A1 * | 11/2008 | Schick | 348/374 |

\* cited by examiner

*Primary Examiner*—Brian Q Le
*Assistant Examiner*—Tsung-Yin Tsai

(57) ABSTRACT

A system constructs an image using virtual lenslets.

40 Claims, 9 Drawing Sheets

DEFECT CORRECTION BASED ON "VIRTUAL" LENSLETS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 10/785,730, entitled DEFECT CORRECTION BASED ON "VIRTUAL" LENSLETS, naming W. Daniel Hillis; Nathan P. Myhrvold; Lowell L. Wood, Jr.; as inventors, filed Feb. 24, 2004, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to imaging.

SUMMARY

In one aspect, a method includes but is not limited to: capturing a primary image representation with a photo-detector array at a primary position; associating a primary set of discrete portions of the primary image representation with one or more defined virtual lenslets of a lens; moving the photo-detector array to another position; capturing another image representation with the photo-detector array at the other position; associating another set of discrete portions of the other image representation with the one or more defined virtual lenslets of the lens; and assembling an image from those virtual lenslet associated portions of the primary and the other image representation that have relatively sharper focuses. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to: a lens associated with one or more virtual lenslets; a controller configured to position a photo-detector array at a primary and another position; an image capture unit configured to capture a primary image at the primary position and another image at the other position; and an image construction unit configured to utilize at least a part of the one or more virtual lenslets in association with at least one of the primary image and the other image. In addition to the foregoing, other system aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

DETAILED DESCRIPTION

Figure 1:
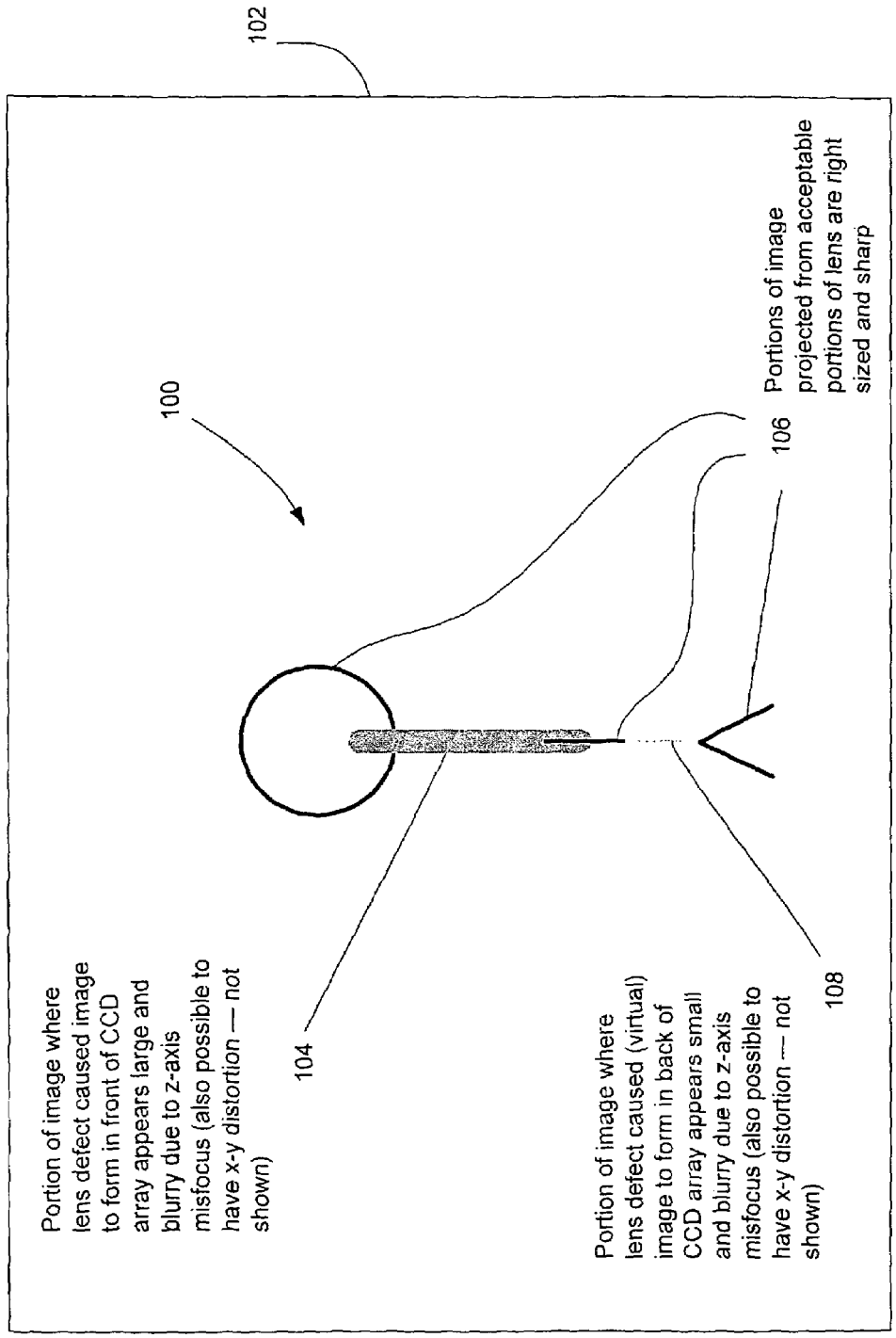
FIG. 1 shows a front-plan view of image 100 of a person (e.g., person 202 of FIG. 2) projected onto photo-detector array 102.

With reference to the figures, and with reference now to FIG. 1, shown is a front-plan view of image 100 of a person (e.g., person 202 of FIG. 2) projected onto photo-detector array 102. Image 100 is shown as distorted due to defects in a lens through which image 100 has been projected (e.g., lens 204 of lens system 200 of FIG. 2). First portion 104 of image 100 is illustrated as large and blurry, which can occur when a lens defect causes portion 104 of image 100 to come to a focus in front of a surface of photo-detector array 102. Second, third, and fourth portions 106 are illustrated as right sized, which can occur when the lens causes portions 106 of image 100 to correctly focus on an imaging surface of photo-detector array 102. Fifth portion 108 is shown as small and faint, which can occur when a lens defect causes portion 108 of image 100 to come to a focus (virtual) behind an imaging surface of photo-detector array 102. In addition, although not expressly shown, those having skill in the art will appreciate that various lens defects could also cause the image to be distorted in x-y; those having skill in the art will also appreciate that different colored wavelengths of light can in and of themselves focus at different positions due to differences in refraction of the different colored wavelengths of light. In addition, although not expressly shown herein, those having skill in the art will appreciate that the subject matter disclosed herein may serve to remedy misfocusings/distortions arising from defects other than lens defects, such as, for example, defects in the imaging surface of photo-detector array 102 and/or defects in frames that hold one or more lenses.

Figure 2:
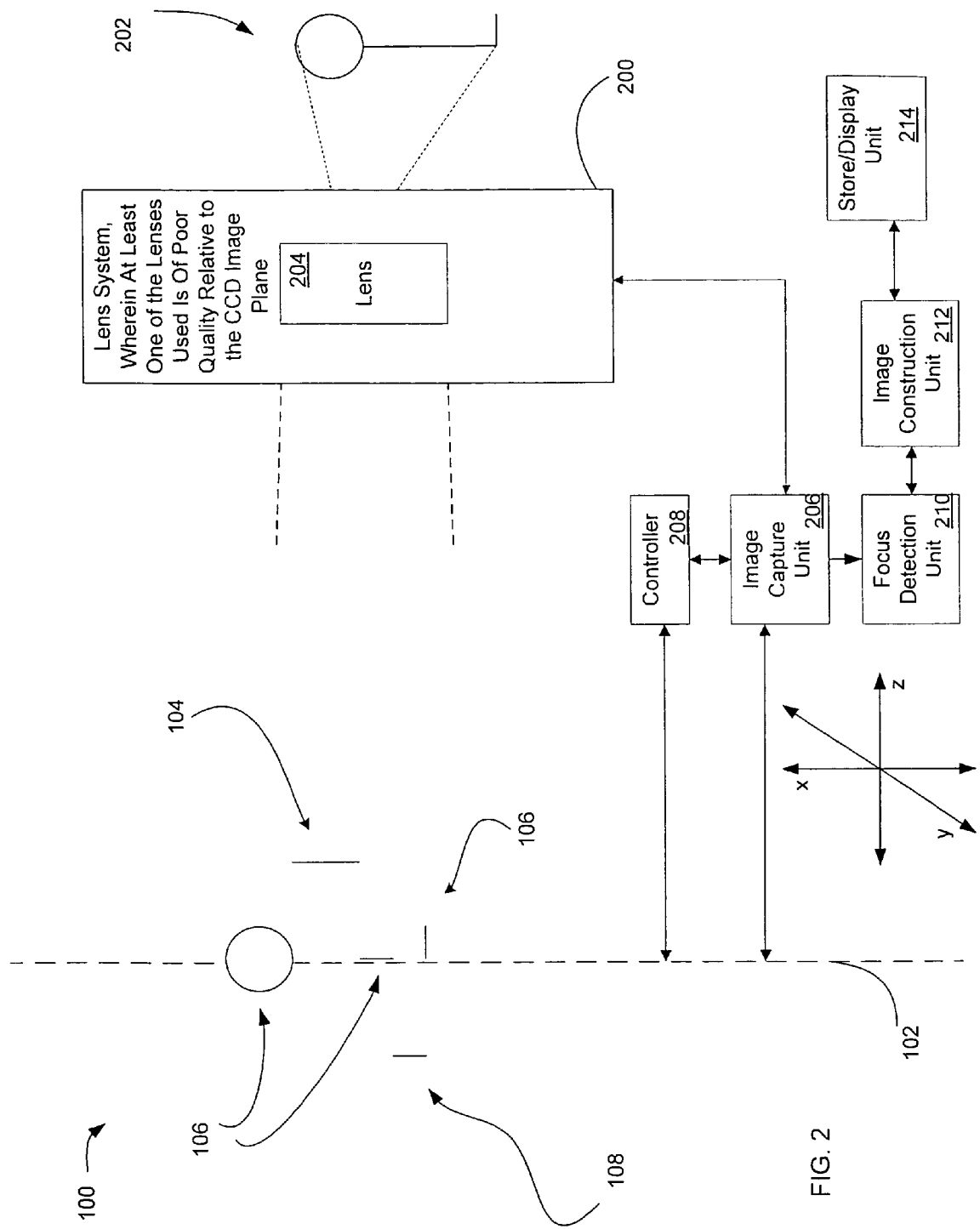
FIG. 2 depicts a side-plan view of lens system 200 that can give rise to image 100 of FIG. 1.

Referring now to FIG. 2, depicted is a side-plan view of lens system 200 that can give rise to image 100 of FIG. 1. Lens 204 of lens system 200 is illustrated as located at a primary position and having defects that give rise to the five different portions of image 100 shown and described in relation to FIG. 1. First portion 104 of image 100 is illustrated as focused in front of an imaging surface of photo-detector array 102. Second, third, and fourth portions 106 are illustrated as right sized and focused on an imaging surface of photo-detector array 102. (It is recognized that in side plan view the head and feet of person 202 would appear as lines; however, for sake of clarity, they are shown in profile in FIG. 2 to help orient the reader relative to FIG. 1.) Fifth portion 108 is shown as small and faint, and virtually focused behind an imaging surface of photo-detector array 102. In addition, although not expressly shown herein, those having skill in the art will appreciate that the subject matter of FIG. 2 is also illustrative of those situations in which one or more individual photo-detectors forming part of the imaging surface of photo-detector array 102—rather than one or more lenses of lens system 200—deviate from one or more predefined positions by amounts such that image misfocuses/distortions arising from such deviations are unacceptable. That is, insofar as image misfocusing and/or distortion could just as easily arise from photo-detector array 102 having mispositioned photo-detectors as from lens system 200 having mispositioned/defective lenses, the subject matter disclosed herein may serve to remedy misfocusings/distortions arising from defects in the imaging surface of photo-detector array 102.

Continuing to refer to FIG. 2, further shown are components that can serve as an environment for one or more processes shown and described herein. Specifically, controller 208 is depicted as controlling the position of photo-detector array 102 (e.g., via use of a feedback control subsystem). Image capture unit 206 is illustrated as receiving image data from photo-detector array 102 and receiving control signals from controller 208. Image capture unit 206 is shown as transmitting captured image information to focus detection unit 210. Focus detection unit 210 is depicted as transmitting focus data to image construction unit 212. Image construction unit 212 is illustrated as transmitting a composite image to image store/display unit 214.

Figure 3:
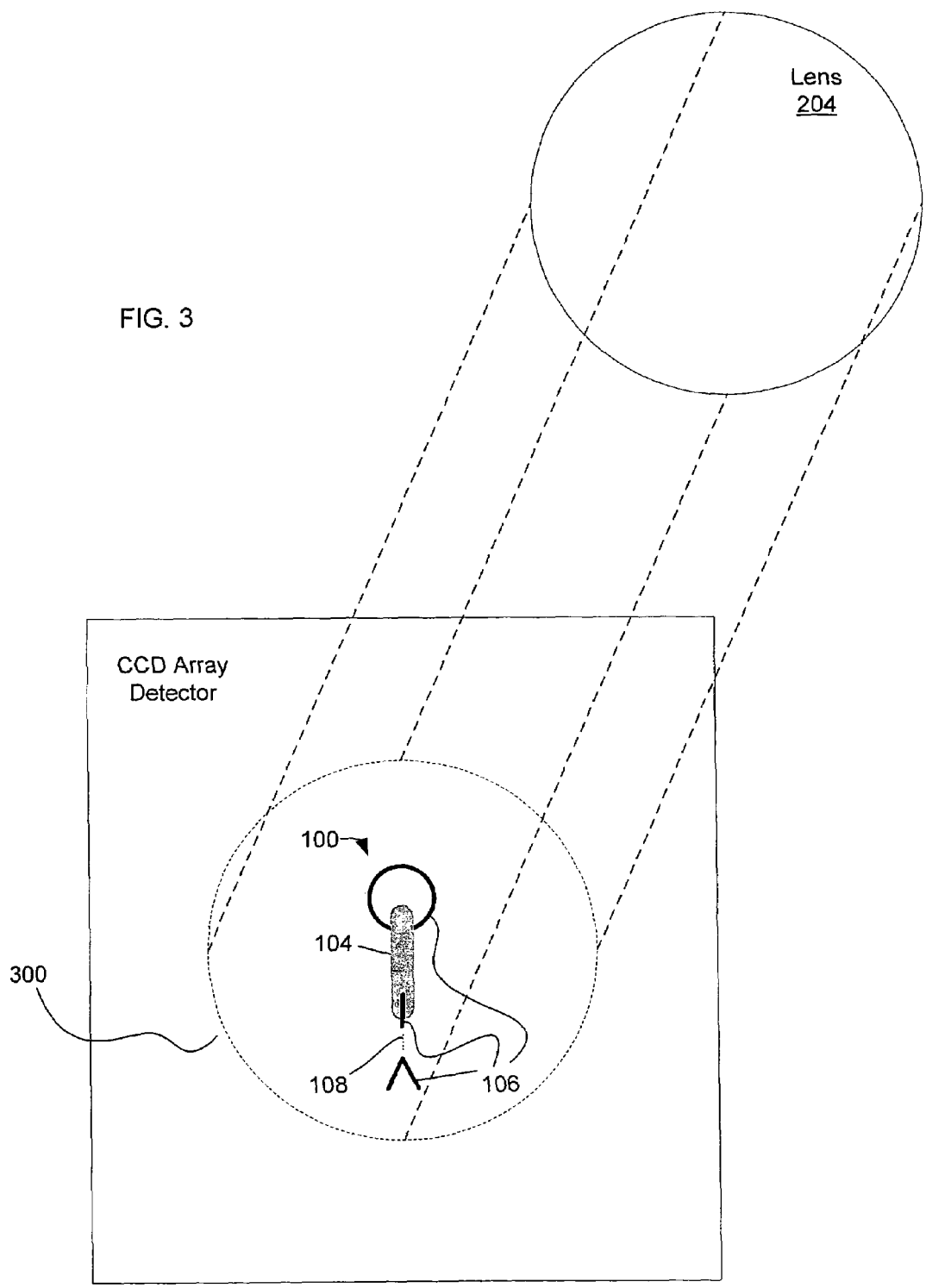
FIG. 3 illustrates a perspective view of lens 204 positioned to focus light onto an imaging surface of photo-detector array 102.

With reference now to FIG. 3, illustrated is a perspective view of lens 204 positioned to focus light onto an imaging surface of photo-detector array 102. The focused light is illustrated as projecting a geometric pattern 300 onto the imaging surface of photo-detector array 102 that is more or less the same shape as lens 204. Image 100 (e.g., FIGS. 1 and 2) is shown being projected within the confines of geometric pattern 300. As noted, lens 204 gives rise to portions 104, 106, and 108 of image 100. The inventors have discovered that the misfocused/distorted portions 104 and 108 can be corrected by using a virtual lens technique.

Figure 4:
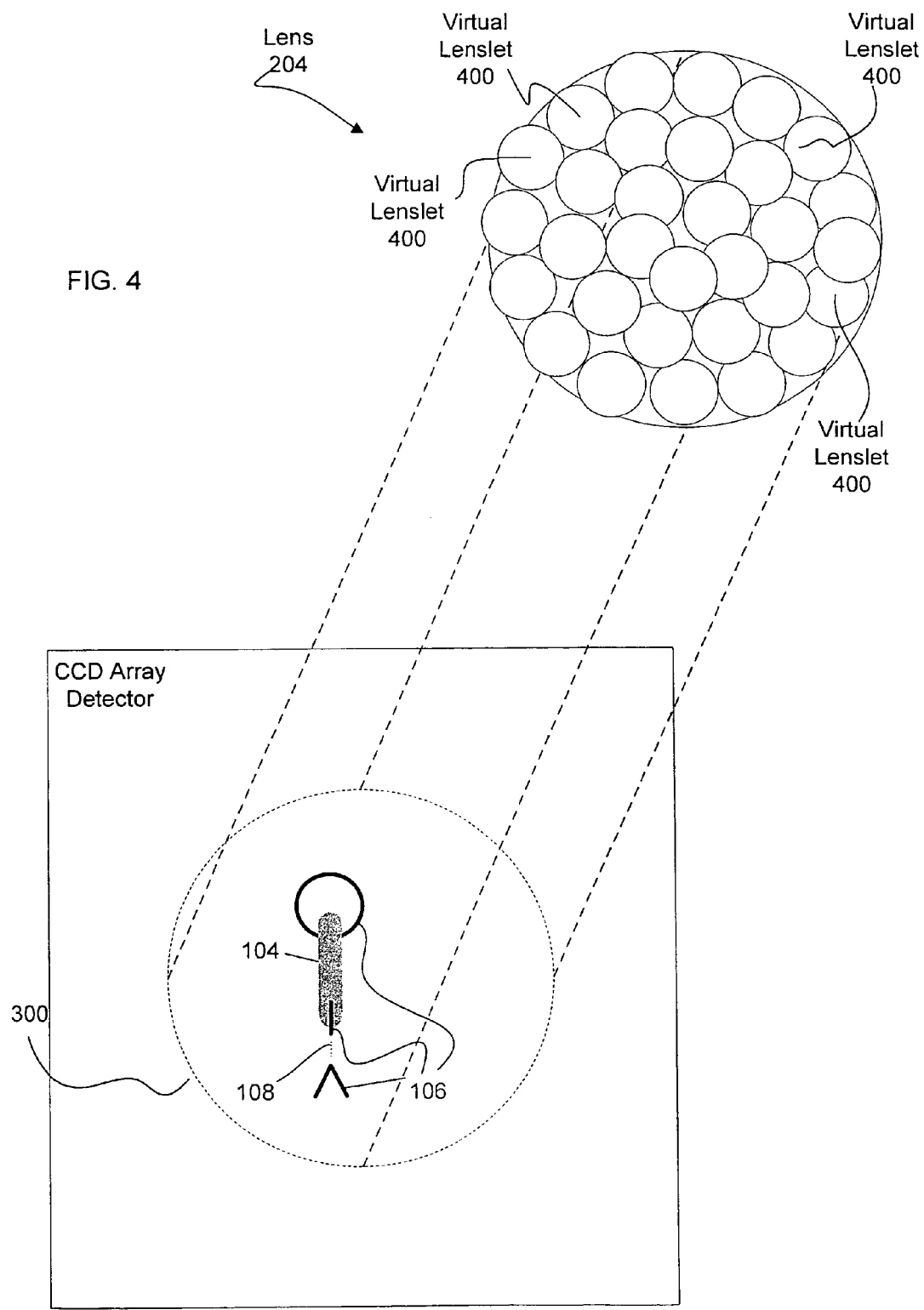
FIG. 4 shows the perspective view of FIG. 3 wherein exemplary "virtual lenslets" are illustrated.

Referring now to FIG. 4, shown is the perspective view of FIG. 3 wherein exemplary "virtual lenslets" are illustrated. Lens 204 is depicted as having inscribed within it several small circles that may be conceived of as "virtual lenslets" 400. The term "virtual" is used herein to indicate that in most instances these virtual lenslets are conceptual overlays (e.g., mathematical constructs) onto at least a portion of the actual physical lens 204. In various implementations, the overlays are done mathematically and/or computationally.

Figure 5:
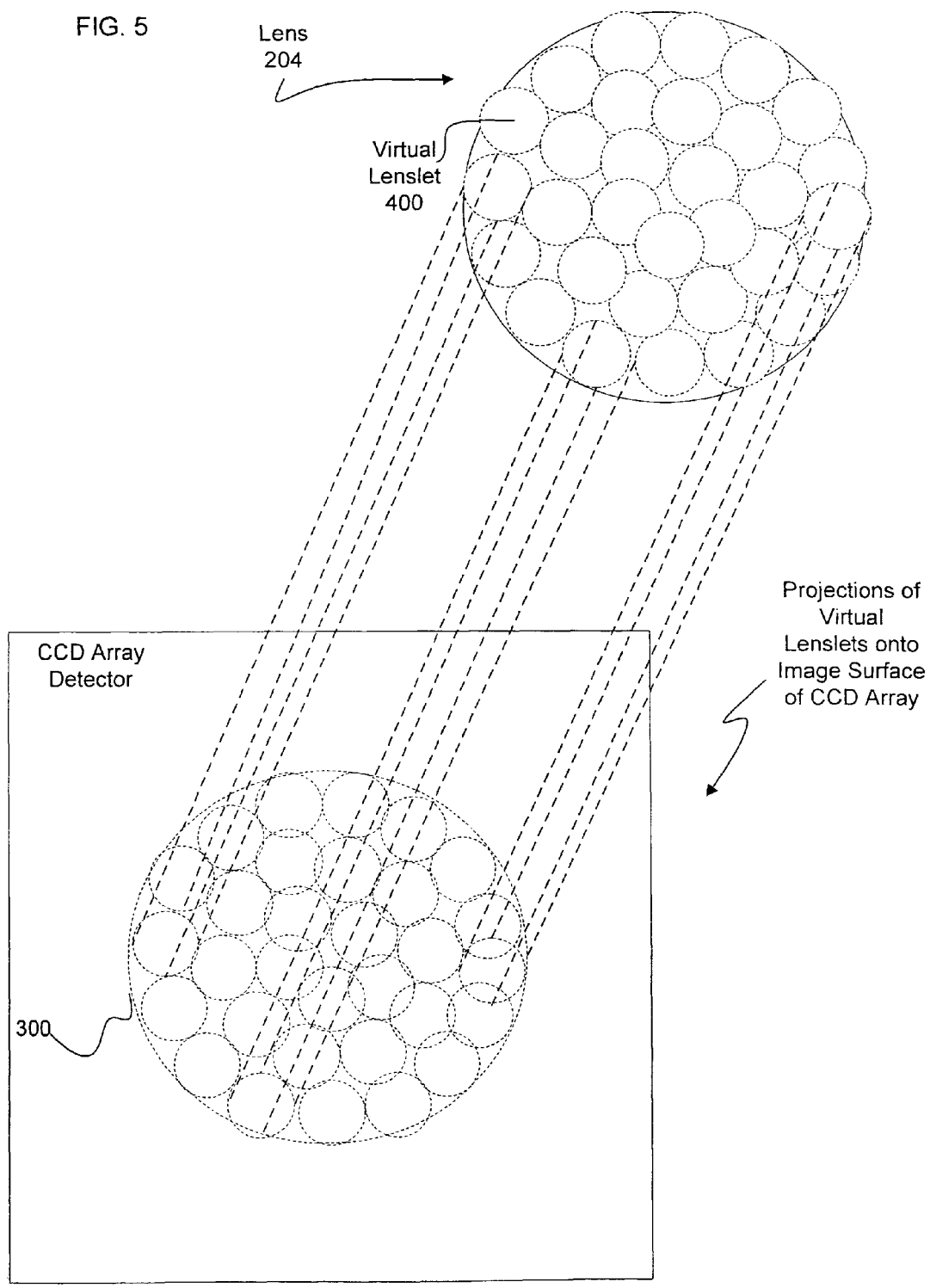
FIG. 5 depicts the perspective view of FIG. 4 wherein projections of the exemplary virtual lenslets onto the imaging surface of photo-detector array 102 are illustrated.

With reference now to FIG. 5, depicted is the perspective view of FIG. 4 wherein projections of the exemplary virtual lenslets onto the imaging surface of photo-detector array 102 are illustrated. Virtual lenslets 400 are shown as geometrically projected within the confines of geometric pattern 300 on the imaging surface of photo-detector array 102. In various implementations, the projections are done mathematically and/or computationally.

As noted elsewhere herein, lens defects and/or other factors may give rise to z-axis misfocusing and/or x-y plane distortion in all or part of image 100. In one implementation, all or part of such z-axis misfocusing and/or x-y plane distortion is corrected by using one or more virtual lenses in conjunction with tilting and/or rotation of photo-detector array 102.

Figure 6:
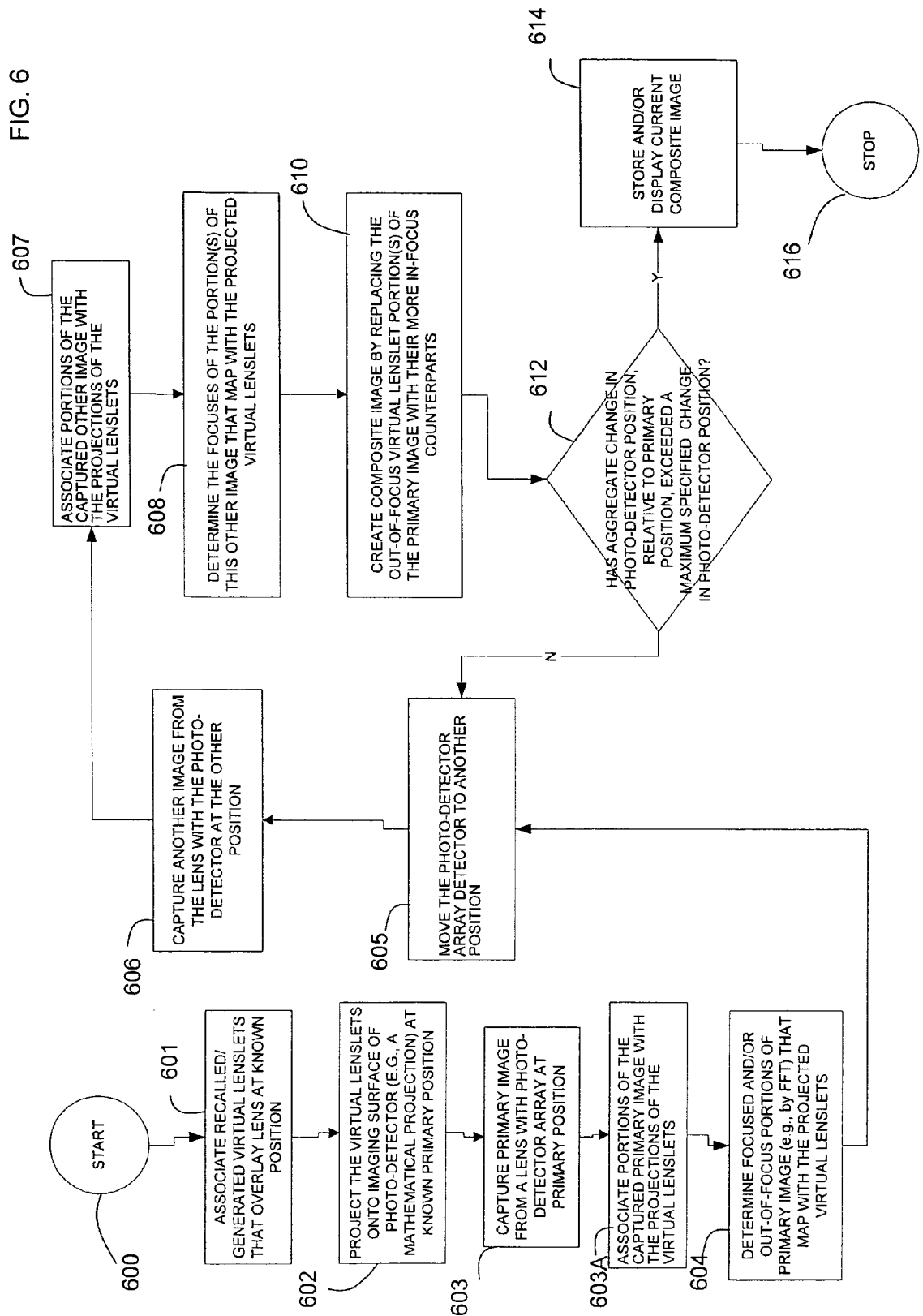
FIG. 6 depicts a high level logic flowchart of a process. Method step 600 shows the start of the process.

Referring now to FIG. 6, depicted is a high level logic flowchart of a process. Method step 600 shows the start of the process. Method step 601 depicts associating/generating virtual lenslets that overlay a lens at a known position. For example, for any particular lens, a pre-stored set of virtual lenses for such a particular lens might be recalled or might be calculated in near real-time. In some instances, the calculation is keyed to image requirements (e.g., higher resolution requirements would typically engender more virtual lenslets and lower resolution requirements would typically engender fewer virtual lenslets).

Referring again to FIG. 2, one specific example of method step 601 (FIG. 6) would be image capture unit 206 recalling a set of mathematical functions defining virtual lenslets (e.g., virtual lenslets 400 of FIG. 4) from memory storage and thereafter fitting the recalled virtual lenslet mathematical functions onto/into a likewise recalled known mathematical geometry of lens 204 of FIGS. 2, 3, and 4. Another specific example of method step 601 (FIG. 6) would be image capture unit 206 calculating set of mathematical functions defining virtual lenslets (e.g., virtual lenslets 400 of FIG. 4) in response to user resolution requirements, and thereafter fitting the calculated virtual lenslet mathematical functions onto/into an either a measured, a calculated, or a recalled known mathematical geometry of lens 204 of FIGS. 2, 3, and 4.

Method step 602 illustrates projecting the virtual lenslets onto an imaging surface of a photo-detector at a known primary position (e.g., a mathematical projection).

Referring again to FIG. 2, one specific example of method step 602 (FIG. 6) would be image capture unit 206 obtaining from lens system 200's control system (not shown) positioning information of lens 204 and thereafter using that position information, in conjunction with the mapped virtual lenslets (e.g., method step 601), to mathematically project the virtual lenslets onto a known imaging surface primary position of photo-detector array 102. In one specific example, image capture unit 206 obtains the imaging surface primary position from controller 208.

Method step 603 depicts capturing a primary image with a photo-detector array at a primary position. In one implementation, method step 603 includes the sub-step of capturing the primary image at an average primary focal surface location of a lens. In another implementation, method step 603 includes the sub-step of capturing the primary image with a photo-detector array at the average primary focal surface location of a lens (e.g., positioning the lens such that a defined focal surface of the lens coincides with an imaging surface of a photo-detector array).

Referring again to FIG. 2, one specific example of method step 603 (FIG. 6) would be controller 208 positioning photo-detector array 102 at a primary position, and thereafter instructing image capture unit 206 to capture an image from photo-detector array 102.

Method step 603A depicts associating portions of the captured primary image with the projections of the virtual lenslets. In one implementation, method step 603A includes the sub-step of associating portions of the captured primary image with mathematical projections of the virtual lenslets.

Referring again to FIGS. 2, 4, and 5, one specific example of method step 603A (FIG. 6) would be image capture unit 206 mapping the mathematical projections of the virtual lenslets 400 (FIGS. 4 and 5) into the primary image captured from photo-detector array 102.

With reference again to FIG. 6, method step 604 illustrates determining focused and/or out-of-focus portions of the primary image that map with the projected virtual lenslets. In one implementation, method step 604 includes the sub-step of calculating a Fourier transform of at least a part of the primary image that maps to a virtual lenslet (e.g., sharp, or in-focus images produce abrupt transitions that often have significant high frequency components).

Referring again to FIG. 2, one specific example of method step 604 (FIG. 6) would be focus detection unit 210 performing a Fourier transform and subsequent analysis on those virtual-lenslet mapped parts of an image that has been captured by image capture unit 206 when photo-detector array 102 was at the primary position. In this example, focus detection unit 210 could deem portions of the image having significant high frequency components as "in focus" images. As a more specific example, the Fourier transform and analysis may be performed on one or more parts of the image that are associated with one or more virtual lenslets 400 of lens 204 (e.g., FIGS. 4 and 5).

With reference again to FIG. 6, method step 605 shows moving the photo-detector array to another position. In one implementation, method step 605 further includes the sub-step of moving at least a part of the photo-detector array to the other position while the lens is held stationary (e.g., photo-detector array 102 is moved to another position, while lens 204 remains stationary, such as shown and described in relation to FIGS. 4 and 5). In another implementation, the step of moving at least a part of the photo-detector array to the other position further includes the sub-step of tilting the photo-detector array. In another implementation, the step of moving at least a part of the photo-detector array to the other position further includes the sub-step of rotating the photo-detector array. In another implementation, the step of moving at least a part of the photo-detector array to the other position further includes the sub-step of tilting and rotating the photo-detector array. In another implementation, the step of moving at least a part of the photo-detector array to the other position further includes the sub-step of distorting the photo-detector array such that the at least a part of the photo-detector array resides at the other position (e.g., a part of photo-detector array 102 is moved to another position, such as might happen if photo-detector array 102 were to be compressed laterally in a controlled manner or moved using micro-electro-mechanical-systems (MEMS) techniques, while lens 204 remains stationary, such as shown and described in relation to FIGS. 7, 8, and/or 9). Those having skill in the art will appreciate that the herein described tilting and/or rotating will move the photo-detector array in x, y, and/or z directions such that other image surfaces of lens 204 may be captured.

Figure 7:
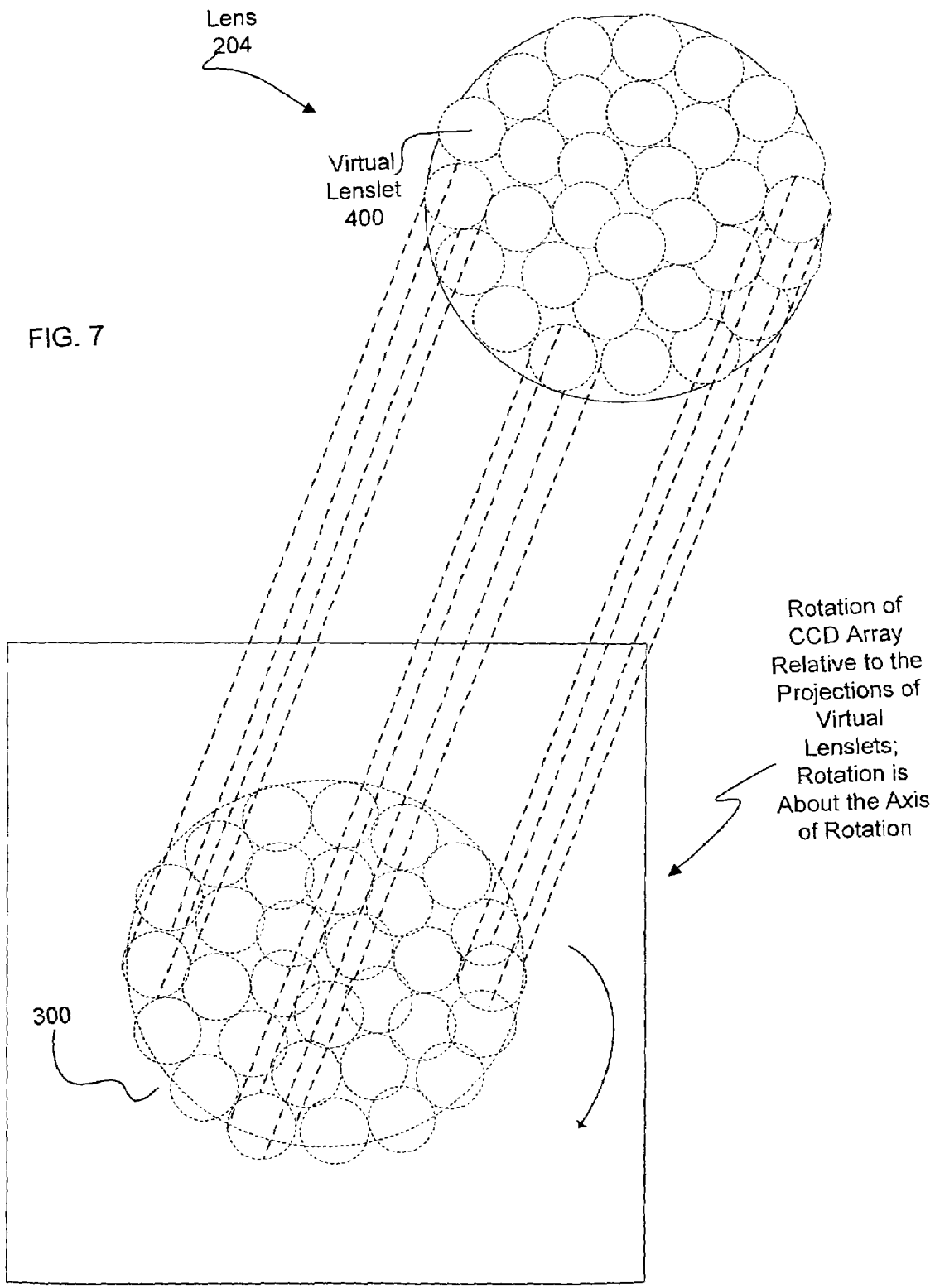
FIGS. 7 and 8 depict partial perspective views of the system of FIG. 2 wherein photo-detector array 102 is being moved in accordance with aspects of processes shown and described herein (e.g., in relation to FIG. 6).
Figure 8:
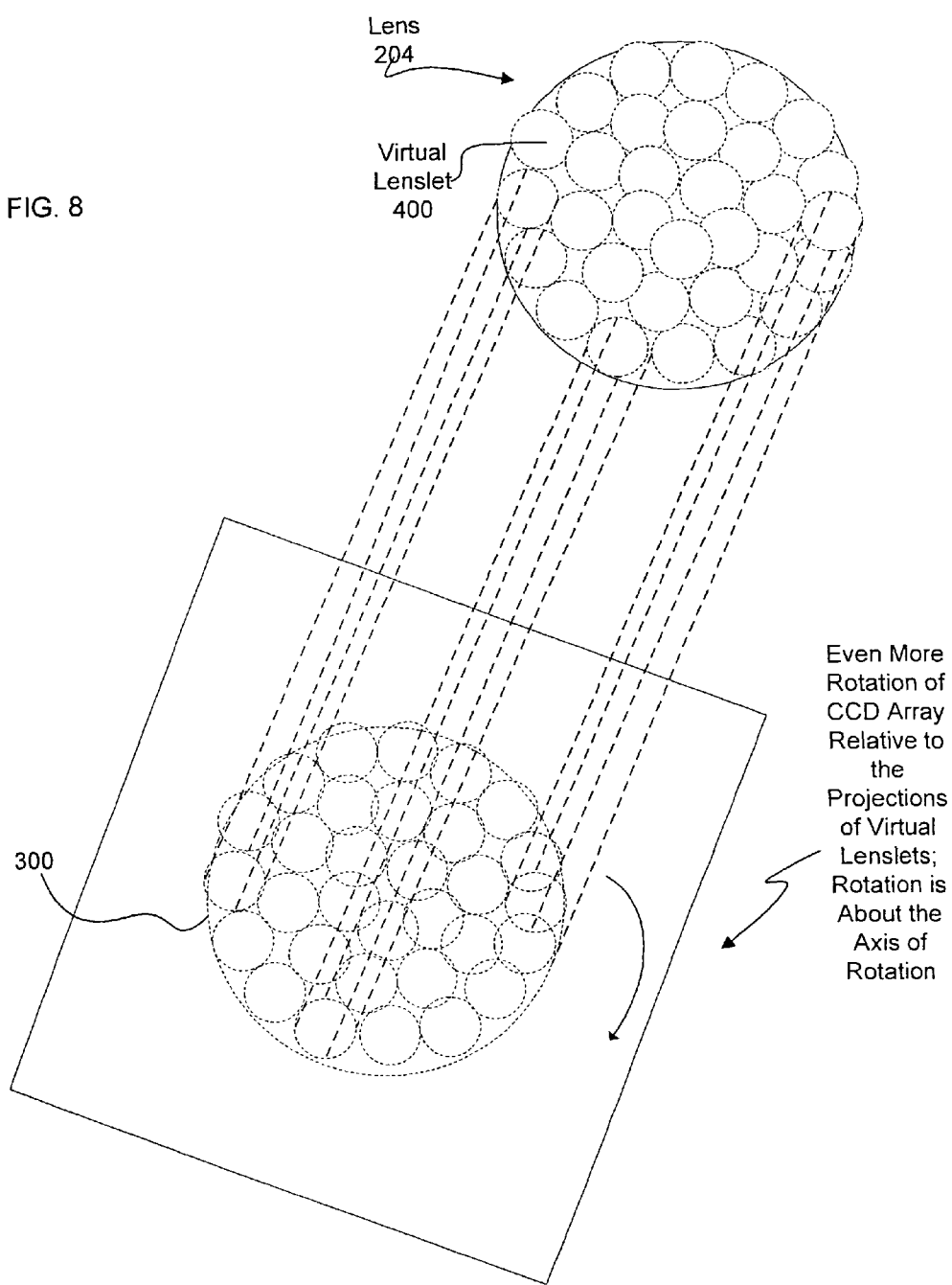

Referring now to FIGS. 2, 7, 8, and/or 9, one specific example of method step 605 (FIG. 6) would be controller 208 positioning photo-detector array 102 at the other position using feedback control sub-systems (not shown). Those having skill in the art will appreciate that the herein described tilting and/or rotating will move photo-detector array 102 in x, y, and/or z directions such that other image surfaces of lens 204 may be approximately captured. As a specific example, successively tilting photo-detector array 102 such that successive relatively-in-focus virtual lenslet projections of first portion 104 or fifth portion 108 may be captured at or near the focused and/or undistorted first portion 104 or fifth portion 108 (e.g., as shown and described in relation to FIG. 2).

With reference again to FIG. 6, method step 606 shows capturing another image with the photo-detector array at the other position. In one implementation, method step 606 further includes the sub-step of extracting at least one of a red, blue, and green color component of the other image. In another implementation, the step of extracting at least one of a red, blue, and green color component of the other image further includes the sub-step of numerically filtering the other image.

Referring now to FIGS. 2, 7, 8, and/or 9, one specific example of method step 606 (FIG. 6) would be image capture unit 206 capturing an image from photo-detector array 102 at the other position. In one implementation, logic of image capture unit 206 communicates with logic of controller 208 to capture the other image when photo-detector array 102 is as the other position. In one implementation, logic of image capture unit 206 extracts at least one of a red, blue, and green color component of the other image. In one implementation, logic of image capture unit 206 extracts the at least one of a red, blue, and green color component by use of numerical filtering techniques.

Method step 607 depicts associating portions of the captured other image with the projections of the virtual lenslets. In one implementation, method step 607 includes the sub-step of associating portions of the captured other image with mathematical projections of the virtual lenslets through a volume of space and onto an imaging surface of the photo-detector array at the other position.

Referring again to FIGS. 2, 7, 8, and/or 9, one specific example of method step 607 (FIG. 6) would be image capture unit 206 mapping the mathematical projections of the virtual lenslets 400 (FIGS. 4 and 5) into the other image captured from photo-detector array 102. In one implementation of method step 607, logic of image capture unit 206 maps the mathematical projections of virtual lenslets 400 (FIGS. 4 and 5) into the other image captured from photo-detector array 102. In one implementation of method step 607, logic of image capture unit 206 determines where on re-positioned photo-detector array 102 the virtual lenslets 400 will project (e.g., mathematically projecting the virtual lenslets onto a known imaging surface location of the re-positioned photo-detector array).

With reference again to FIG. 6, method step 608 depicts determining the focuses of the portion(s) of this other image that map with the projected virtual lenslets (e.g., the virtual lenslets of method step 601).

In one implementation, method step 608 includes the sub-step of calculating a Fourier transform of at least a part of at least one region of the other image that maps with the projected virtual lenslets (e.g., sharp or in-focus images produce abrupt transitions that often have significant high frequency components). In one implementation, the step of calculating a Fourier transform of at least one region of the other image that maps with the projected virtual lenslets includes the sub-step of determining the Fourier transform and analysis on one or more parts of the image that are associated with one or more virtual lenslet projections intersecting the re-positioned photo-detector array.

Referring again to FIGS. 2, 7, 8, and/or 9, one specific example of method step 608 (FIG. 6) would be focus detection unit 210 performing a Fourier transform and subsequent analysis on at least a part of an image captured by image capture unit 206 when photo-detector array 102 was at the other position specified by controller 208. In one specific example, focus detection unit 210 receives an image and its associated virtual lenslet projections from image capture unit 206 and thereafter performs the Fourier transforms and subsequent analyses on a per-virtual-lenslet basis, and thereafter stores the results of the transforms and analyses in memory. Those skilled in the art will appreciate that such Fourier transforms and subsequent analyses constitute specific examples of more general "image scores," and that other suitable image analysis techniques, consistent with the teachings herein, may be substituted for the Fourier transform and analysis.

With reference again to FIG. 6, method step 610 depicts constructing a composite image by replacing the out-of-focus virtual lenslet portion(s) of the primary image with their more in-focus counterparts. In one implementation, method step 610 includes the sub-step of replacing at least a part of one out-of-focus virtual-lenslet region of the primary image with at least a part of one more-in-focus virtual-lenslet region of the other image. In yet another implementation, method step 610 includes the sub-step of utilizing at least one of tiling image processing techniques, morphing image processing techniques, blending image processing techniques, and stitching image processing techniques.

In yet another implementation, method step 610 includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite image using the corrected distortion. In yet another implementation, these sub-steps are performed on a per-virtual-unit basis. In yet another implementation, method step 610 includes the sub-step of correcting for motion between the primary and the other image. In yet another implementation, this sub-step is performed on a per-virtual-lenslet basis.

Referring again to FIGS. 2, 7, 8, and/or, 9 one specific example of method step 610 (FIG. 6) would be logic of image construction unit 212 creating a composite image by replacing those virtual lenslet associated portions of an image captured at a primary position with more in-focus virtual lenslet associated portions of an image captured by image capture unit 206 when photo-detector array 102 was at the other position. In one implementation of the example, image construction unit 212 corrects for the motion between images using conventional techniques if such correction is desired. In another implementation of the example, motion correction is not used.

With reference again to FIG. 6, method step 612 shows a determination of whether an aggregate change in photo-detector position, relative to the primary position of method step 602, has exceeded a maximum specified change in photo-detector position. For example, even with a relatively poor quality lens, there will typically be an upper manufacturing limit beyond which lens deviations are not expected to go (e.g., the lens has manufacturing criteria such that the lens provide a focal length of 5 mm+/−0.05 mm).

Referring again to FIGS. 2, 7, 8, and/or 9, one specific example of method step 612 (FIG. 6) would be controller 208 comparing an aggregate movement in a defined direction against a pre-stored upper limit value. In an implementation of the example illustrated in FIG. 4, if lens 204 has manufacturing criteria such as a focal length of 5 mm+/−0.05 mm, controller 208 will determine whether the total forward movement of photo-detector array 102 is greater than 0.05 mm relative to the primary position. In an implementation of the example illustrated in FIG. 5, if lens 204 has manufacturing criteria such as a focal length of 5 mm+/−0.05 mm, controller 208 will determine whether the total rearward movement of lens 204 is greater than 0.05 mm relative to the primary position. In other implementations, manufacturing criteria in x-y provide analogous tolerances in x-y distortion which likewise give rise to pre-stored upper limit values in x-y rotation.

With reference again to FIG. 6, if the inquiry of method step 612 yields a determination that the aggregate change in position has met or exceeded the maximum specified change in photo-detector position, the process proceeds to method step 614. Method step 614 illustrates that the current composite image (e.g., of method step 610) is stored and/or displayed. One specific example of method step 614 would be image store/display unit 214 either storing or displaying the composite image.

Method step 616 shows the end of the process.

Returning to method step 612, shown is that in the event that the upper limit on maximum specified change in photo-detector position has not been met or exceeded, the process proceeds to method step 605 and continues as described herein (e.g., moving the photo-detector to yet another position (method step 605) and capturing yet another image (e.g., method step 606)...).

Referring now to FIGS. 7 and 8, depicted are partial perspective views of the system of FIG. 2 wherein photo-detector array 102 is being moved in accordance with aspects of processes shown and described herein (e.g., in relation to FIG. 6). Photo-detector array 102 is illustrated as being rotated through other positions different from the primary position which gave rise to the five different portions of image 100 shown and described in relation to FIGS. 1-5. The remaining components and control aspects of the various parts of FIGS. 7 and 8 (shown and unshown) function as described elsewhere herein.

Figure 9:
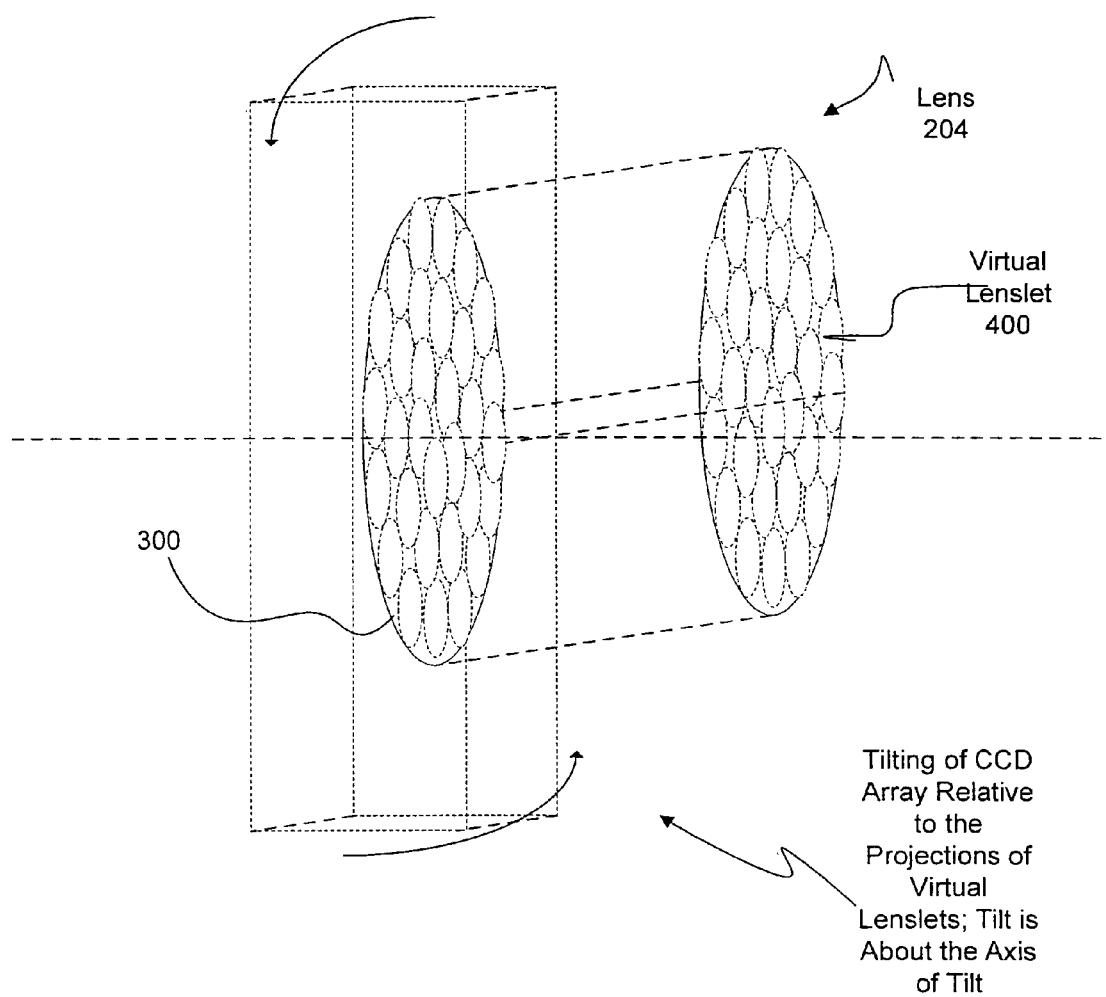
FIG. 9 illustrates a perspective view of the system of FIG. 2 wherein photo-detector array 102 is being moved in accordance with aspects of processes shown and described herein (e.g., in relation to FIG. 6).

Referring now to FIG. 9, illustrated is a perspective view of the system of FIG. 2 wherein photo-detector array 102 is being moved in accordance with aspects of the processes shown and described herein (e.g., in relation to FIG. 6). Photo-detector array 102 is illustrated as being tilted through other positions different from the primary position which gave rise to the five different portions of image 100 shown and described in relation to FIGS. 1 and 2. The remaining components and control aspects of the various parts of FIG. 9 (shown and unshown) function as described elsewhere herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A first method comprising:
    performing a reception of or a transmission of one or more instructions relating to a second method that includes:
        capturing a primary image representation with a photo-detector array at a primary position;
        associating a primary set of discrete portions of the primary image representation with one or more defined virtual lenslets of a lens;
        moving the photo-detector array to another position;
        capturing another image representation with the photo-detector array at the other position;
        associating another set of discrete portions of the other image representation with the one or more defined virtual lenslets of the lens; and
        assembling an image from those virtual lenslet associated portions of the primary and the other image representation that have relatively sharper focuses.

2. The first method of claim 1, wherein said capturing a primary image representation with a photo-detector array at a primary position of said second method comprises:
    extracting at least one of a red, blue, or green color component of the primary image.

3. The first method of claim 2, wherein said extracting at least one of a red, blue, or green color component of the primary image of said second method comprises:
    numerically filtering the primary image.

4. The first method of claim 1, wherein said associating a primary set of discrete portions of the primary image representation with one or more defined virtual lenslets of a lens of said second method comprises:
    obtaining one or more projections of the one or more defined virtual lenslets through a geometric surface in 3-space corresponding to an imaging surface of the photo-detector array at the primary position.

5. The first method of claim 4, wherein said obtaining one or more projections of the one or more defined virtual lenslets through a geometric surface in 3-space corresponding to an imaging surface of the photo-detector array at the primary position of said second method comprises:
    defining one or more geometric shapes at a predefined position of a lens; and
    calculating a projection of the one or more defined geometric shapes to the geometric surface in 3-space corresponding to an imaging surface of the photo-detector array at the primary position.

6. The first method of claim 1, wherein said moving the photo-detector array to another position of said second method comprises:
    tilting the CCD detector array about a defined axis of tilt.

7. The first method of claim 6, wherein said tilting the CCD detector array about a defined axis of tilt of said second method comprises:
    tilting a portion of the photo-detector array forward of the defined axis of tilt.

8. The first method of claim 6, wherein said tilting the CCD detector array about a defined axis of tilt of said second method comprises:
    tilting a portion of the photo-detector array rearward of the defined axis of tilt.

9. The first method of claim 1, wherein said moving the photo-detector array to another position of said second method further comprises:
    rotating the photo-detector array about a defined axis of rotation.

10. The first method of claim 1, wherein said capturing another image representation with the photo-detector array at the other position of said second method comprises:
    extracting at least one of a red, blue, or green color component of the other image.

11. The first method of claim 10, wherein said extracting at least one of a red, blue, or green color component of the other image of said second method comprises:
   numerically filtering the other image.

12. The first method of claim 1, wherein said associating another set of discrete portions of the other image representation with the one or more defined virtual lenslets of the lens of said second method comprises:
   obtaining one or more projections of the one or more defined virtual lenslets through a geometric surface in 3-space corresponding to an imaging surface of the photo-detector array at the other position.

13. The first method of claim 12, wherein said obtaining one or more projections of the one or more defined virtual lenslets through a geometric surface in 3-space corresponding to an imaging surface of the photo-detector array at the other position of said second method comprises:
   defining one or more geometric shapes at a predefined position of a lens; and
   calculating a projection of the one or more defined geometric shapes to the geometric surface in 3-space corresponding to an imaging surface of the photo-detector array at the other position.

14. The first method of claim 1, wherein said assembling an image from those virtual lenslet associated portions of the primary and the other image representation that have relatively sharper focuses of said second method comprises:
   determining an image score for each of the lenslet associated portions; and
   storing the image score.

15. The first method of claim 14, wherein said determining an image score for each of the lenslet associated portions of said second method comprises:
   calculating a Fourier transform of each of the lenslet associated portions.

16. The first method of claim 1, wherein said assembling an image from those virtual lenslet associated portions of the primary and the other image representation that have relatively sharper focuses of said second method comprises:
   correlating a feature of the primary image with a feature of the other image;
   detecting at least one of size, color, or displacement distortion of at least one of the primary image or the other image;
   correcting the detected at least one of size, color, or displacement distortion of the at least one of the primary image or the other image; and
   assembling the composite image using the corrected distortion.

17. The first method of claim 1, wherein said assembling an image from those virtual lenslet associated portions of the primary and the other image representation that have relatively sharper focuses of said second method comprises:
   correlating a feature of a virtual lenslet of the primary image with a feature of a virtual lenslet of the other image;
   detecting at least one of size, color, or displacement distortion of at least one virtual lenslet of the primary image and at least one virtual lenslet of the other image;
   correcting the detected at least one of size, color, or displacement distortion of the at least one virtual lenslet of the primary image and the at least one virtual lenslet of the other image; and
   assembling the composite image using the corrected distortion.

18. A system comprising:
   circuitry for capturing a primary image representation with a photo-detector array at a primary position;
   circuitry for associating a primary set of discrete portions of the primary image representation with one or more defined virtual lenslets of a lens;
   circuitry for moving the photo-detector array to another position;
   circuitry for capturing another image representation with the photo-detector array at the other position;
   circuitry for associating another set of discrete portions of the other image representation with the one or more defined virtual lenslets of the lens; and
   circuitry for assembling an image from those virtual lenslet associated portions of the primary and the other image representations that have relatively sharper focuses.

19. The system of claim 18, wherein said circuitry for capturing a primary image representation with a photo-detector array at a primary position comprises:
   circuitry for extracting at least one of a red, blue, or green color component of the primary image.

20. The system of claim 19, wherein said circuitry for extracting at least one of a red, blue, or green color component of the primary image comprises:
   circuitry for numerically filtering the primary image.

21. The system of claim 18, wherein said circuitry for associating a primary set of discrete portions of the primary image representation with one or more defined virtual lenslets of a lens comprises:
   circuitry for obtaining one or more projections of the one or more defined virtual lenslets through a geometric surface in 3-space corresponding to an imaging surface of the photo-detector array at the primary position.

22. The system of claim 21, wherein said circuitry for obtaining one or more projections of the one or more defined virtual lenslets through a geometric surface in 3-space corresponding to an imaging surface of the photo-detector array at the primary position comprises:
   circuitry for defining one or more geometric shapes at a predefined position of a lens; and
   circuitry for calculating a projection of the one or more defined geometric shapes to the geometric surface in 3-space corresponding to an imaging surface of the photo-detector array at the primary position.

23. The system of claim 18, wherein said circuitry for moving the photo-detector array to another position comprises:
   circuitry for tilting the CCD detector array about a defined axis of tilt.

24. The system of claim 23, wherein said circuitry for tilting the CCD detector array about a defined axis of tilt comprises:
   circuitry for tilting a portion of the photo-detector array forward of the defined axis of tilt.

25. The system of claim 23, wherein said circuitry for tilting the CCD detector array about a defined axis of tilt comprises:
   circuitry for tilting a portion of the photo-detector array rearward of the defined axis of tilt.

26. The system of claim 18, wherein said circuitry for moving the photo-detector array to another position comprises:
   circuitry for rotating the photo-detector array about a defined axis of rotation.

27. The system of claim 18, wherein said circuitry for capturing another image representation with the photo-detector array at the other position comprises:

circuitry for extracting at least one of a red, blue, or green color component of the other image.

28. The system of claim 27, wherein said circuitry for extracting at least one of a red, blue, or green color component of the other image comprises:
circuitry for numerically filtering the other image.

29. The system of claim 18, wherein said circuitry for associating another set of discrete portions of the other image representation with the one or more defined virtual lenslets of the lens comprises:
circuitry for obtaining one or more projections of the one or more defined virtual lenslets through a geometric surface in 3-space corresponding to an imaging surface of the photo-detector array at the other position.

30. The system of claim 29, wherein said circuitry for obtaining one or more projections of the one or more defined virtual lenslets through a geometric surface in 3-space corresponding to an imaging surface of the photo-detector array at the other position comprises:
circuitry for defining one or more geometric shapes at a predefined position of a lens; and
circuitry for calculating a projection of the one or more defined geometric shapes to the geometric surface in 3-space corresponding to an imaging surface of the photo-detector array at the other position.

31. The system of claim 18, wherein said circuitry for assembling an image from those virtual lenslet associated portions of the primary and the other image representations that have relatively sharper focuses comprises:
circuitry for determining an image score for each of the lenslet-associated portions; and
circuitry for storing the image score.

32. The system of claim 31, wherein said circuitry for determining an image score for each of the lenslet-associated portions comprises:
circuitry for calculating a Fourier transform of each of the lenslet associated portions.

33. The system of claim 18, wherein said circuitry for assembling an image from those virtual lenslet associated portions of the primary and the other image representations that have relatively sharper focuses comprises:
circuitry for correlating a feature of the primary image with a feature of the other image;
circuitry for detecting at least one of size, color, or displacement distortion of at least one of the primary image or the other image;
circuitry for correcting the detected at least one of size, color, or displacement distortion of the at least one of the primary image or the other image; and
circuitry for assembling the composite image using the corrected distortion.

34. The system of claim 18, wherein said circuitry for assembling an image from those virtual lenslet associated portions of the primary and the other image representations that have relatively sharper focuses comprises:
circuitry for correlating a feature of a virtual lenslet of the primary image with a feature of a virtual lenslet of the other image;
circuitry for detecting at least one of size, color, or displacement distortion of at least one virtual lenslet of the primary image and at least one virtual lenslet of the other image;
circuitry for correcting the detected at least one of size, color, or displacement distortion of the at least one virtual lenslet of the primary image and the at least one virtual lenslet of the other image; and
circuitry for assembling the composite image using the corrected distortion.

35. A system comprising:
a lens associated with one or more virtual lenslets;
a controller configured to position a photo-detector array at a primary and another position;
an image capture unit configured to capture a primary image at the primary position and another image at the other position; and
an image construction unit configured to utilize at least a part of the one or more virtual lenslets in association with at least one of the primary image or the other image.

36. The system of claim 35, wherein said controller configured to position a photo-detector array at a primary and another position further comprises:
a transducer system having a control signal input operably coupled with said controller and a motion output operably coupled with said photo-detector array.

37. The system of claim 36, wherein said transducer system further comprises an electric motor operably coupled to move said photo-detector array.

38. The system of claim 36, wherein said transducer system further comprises an electric motor operably coupled to distort said photo-detector array.

39. The system of claim 35, wherein said image capture unit configured to capture a primary image at the primary position and another image at the other position further comprises:
circuitry for obtaining one or more projections of the one or more virtual lenslets through a geometric surface in 3-space corresponding to an imaging surface of the photo-detector array.

40. The system of claim 35, wherein said image construction unit configured to utilize at least a part of the one or more virtual lenslets in association with at least one of the primary image or the other image further comprises:
circuitry for utilizing at least a part of the one or more virtual lenslets in association with at least one of the primary image or the other image said circuitry including at least one of electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, or electrical circuitry having a communications device.

* * * * *

UNITED STATES PATENT AND TRADEMARK OFFICE
CERTIFICATE OF CORRECTION

| | | |
|---|---|---|
| PATENT NO. | : 7,840,038 B2 | |
| APPLICATION NO. | : 11/636418 | |
| DATED | : November 23, 2010 | |
| INVENTOR(S) | : Hillis et al. | |

It is certified that error appears in the above-identified patent and that said Letters Patent is hereby corrected as shown below:

At Column 12, Line 60, Claim 9 please replace "...method further comprises..." with -- method comprise --

Signed and Sealed this
Twenty-fifth Day of December, 2012

David J. Kappos
*Director of the United States Patent and Trademark Office*